United States Patent
Aoki et al.

(10) Patent No.: US 7,517,027 B2
(45) Date of Patent: Apr. 14, 2009

(54) HYDRAULIC BRAKE DEVICE

(75) Inventors: Yasushi Aoki, Saitama (JP); Akiharu Kanagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 502 days.

(21) Appl. No.: 11/333,634

(22) Filed: Jan. 17, 2006

(65) Prior Publication Data
US 2006/0158026 A1 Jul. 20, 2006

(30) Foreign Application Priority Data
Jan. 17, 2005 (JP) ............................. 2005-009067

(51) Int. Cl.
*B60T 8/44* (2006.01)
*B60T 8/88* (2006.01)

(52) U.S. Cl. ................... 303/114.1; 303/122.09; 303/122.13; 303/113.4; 188/359; 60/547.3; 60/550; 60/582

(58) Field of Classification Search ............... 303/122, 303/122.09, 122.12, 122.13, 122.14, 113.1, 303/113.4, 114.1; 188/358, 359; 60/547.1, 60/547.3, 550, 557, 558, 560, 582
See application file for complete search history.

(56) References Cited
U.S. PATENT DOCUMENTS

| | | | | |
|---|---|---|---|---|
| 3,685,289 A | | 8/1972 | Kobashi et al. | |
| 4,416,491 A | * | 11/1983 | Belart et al. | 303/114.1 |
| 4,618,189 A | | 10/1986 | Nakanishi et al. | |
| 4,655,512 A | * | 4/1987 | Leiber | 303/113.4 |
| 4,736,588 A | * | 4/1988 | Leiber | 60/550 |
| 6,641,233 B2 | * | 11/2003 | Kusano et al. | 303/113.5 |
| 6,729,698 B2 | * | 5/2004 | Kusano et al. | 188/352 |
| 2003/0071518 A1 | * | 4/2003 | Kusano et al. | 303/114.1 |

FOREIGN PATENT DOCUMENTS

JP  2002-264795  9/2002

* cited by examiner

*Primary Examiner*—Thomas J Williams
(74) *Attorney, Agent, or Firm*—Carrier, Blackman & Associates, P.C.; William D. Blackman; Joseph P. Carrier

(57) ABSTRACT

A normally closed secondary solenoid opening/closing valve 36 is provided along a secondary branched fluid pipe 35 establishing a communication between an accumulator 11 and a reservoir 8 through a fluid pressure input side to a fluid pressure output side of a regulator valve 3, and in the event that a fluid pressure supplied to the regulator valve 3 decreases down to or lower than a predetermined range due to something abnormal occurring in the accumulator 11, the state of the secondary solenoid opening/closing valve 36 is changed over from a closed state to an opened state, whereby a residual pressure in the accumulator 11 and a residual pressure in the output fluid pressure chamber 15 can be released through the reservoir 8 which is in communication therewith through an output fluid pipe 31 and the secondary branched fluid pipe 35 along which the secondary opening/closing valve 36 is provided.

8 Claims, 3 Drawing Sheets

HYDRAULIC BRAKE DEVICE

The present invention claims foreign priority to Japanese patent application No. P.2005-009067, filed on Jan. 17, 2005, the contents of which is incorporated herein by reference.

BACKGROUND OF THE INVENTION

1. Field of the Invention

The present invention relates to a hydraulic brake device.

2. Description of the Background Art

As a hydraulic brake device provided on a vehicle such as an automobile, there exists a hydraulic brake device which is disclosed in, for example, Japanese Patent Unexamined Publication No. JP-A-2002-264795 (claim 1, FIG. 1). This hydraulic brake device includes a fluid pressure source having an accumulator which accumulates therein operating fluid, a regulator valve which regulates a fluid pressure supplied from the fluid pressure source in accordance with an effort applied to a brake pedal for output, a master cylinder which is activated by virtue of a fluid pressure supplied from the regulator valve to an auxiliary fluid pressure chamber so as to generate a fluid pressure in accordance with the fluid pressure within the auxiliary fluid pressure chamber in a master cylinder fluid pressure chamber for output and wheel cylinders which are activated by virtue of an output fluid pressure from the master cylinder so as to apply braking force to corresponding road wheels of a vehicle, whereby a large braking force can be obtained with a small effort applied to the brake pedal by virtue of the fluid pressure regulated at the regulator valve.

Incidentally, the hydraulic brake device of the JP-A-2002-264795 has a so-called fail-safe function in which in the event that a fluid pressure accumulated in an accumulator decreases down to or lower than a predetermined range or that the fluid pressure becomes almost zero due to the failure of the accumulator, a valve spool slidably fitted in a valve element of a regulator valve is forced forward by only an effort applied to a brake pedal by the driver so as to mechanically push a piston in a master cylinder fluid pressure chamber to thereby generate a braking force.

In case, however, a residual pressure exists within the accumulator when executing the fail-safe function, the residual pressure is outputted into an output fluid pressure chamber of the regulator valve in association with the forward movement of the valve spool and the residual pressure continues to act rearwards against the forward moving valve element. Thus, since the residual pressure so acting constitutes a resisting force against the effort applied to the brake pedal and a force which interrupts the forward movement of the valve element, there has existed a risk that a predetermined braking force cannot be obtained.

In addition, in the hydraulic brake device of the JP-A-2002-264795, in the event that there occurs something going wrong on the regulator valve side while the predetermined fluid pressure is being outputted from the accumulator to the regulator valve, a fluid pressure that is outputted from the regulator valve to the auxiliary fluid pressure chamber when the brakes are applied decreases remarkably, whereby there has existed a risk that the predetermined braking force cannot be obtained.

SUMMARY OF THE INVENTION

In view of the above described problems, an object of the invention is to provide a hydraulic brake device which can ensure that a predetermined braking force can be obtained by a mechanical action resulting from only an effort applied to the brake pedal by removing the effect of the residual pressure even in the event of something abnormal occurring in the accumulator and/or the regulator valve.

With a view to attaining the object, according to a first aspect of the invention, there is provided a hydraulic brake device comprising:

a reservoir;
a fluid pressure generating unit comprising:
a pump for pumping operating fluid out of the reservoir; and
an accumulator for accumulating the pumped out operating fluid within a predetermined pressure range;
a regulator valve for regulating and outputting a fluid pressure supplied from the accumulator in accordance with an operation amount of a brake operation member;
a housing in which the regulator valve is slidably fitted;
a master cylinder piston which is slidably fitted forward of the regulator valve in the housing, wherein
when a normal time, the master cylinder piston is moved by virtue of the output fluid pressure outputted from the regulator valve so as to generate the master cylinder pressure, and
when something abnormal occurs in which the fluid pressure supplied from the accumulator to the regulator valve decreases down to or lower than the predetermined range, the master cylinder piston which is in press contact with an outer end face of the regulator valve is moved direct mechanically so as to generate the master cylinder pressure by mechanically moving forward the regulator valve by virtue of a force applied by the brake operation member;
a normally closed opening/closing valve provided along a fluid line communicating between a side of the accumulator and the reservoir by way of the fluid pressure input side and a fluid pressure output side of the regulator valve or a fluid line communicating directly between the accumulator and the reservoir;
a fluid pressure value detecting unit for detecting a value of the fluid pressure supplied from the accumulator to the regulator valve; and
a control unit for controlling the opening and closing of the opening/closing valve based on detection information from the fluid pressure value detecting unit,
wherein the control unit changes over the state of the opening/closing valve from a closed state to an opened state in the event that the control unit determines that the fluid pressure supplied from the accumulator to the regulator valve decreases down to or lower than the predetermined range based on the detection information from the fluid pressure value detecting unit.

According to the first aspect of the invention, in the event that the fluid pressure that is supplied to the regulator valve decreases down to or lower than the predetermined range due to something abnormal occurring in the accumulator, the residual pressure in the accumulator and the residual pressure in the regulator valve can be released through the reservoir which communicates with the fluid line along which the opening/closing valve is provided by way of the same fluid line by changing over the state of the opening/closing valve from the closed state to the opened state.

According to a second aspect of the invention, there is provided a hydraulic brake device as set forth in the first aspect of the invention, wherein when the opening/closing valve is changed over from the closed state to the opened state, a stop signal is outputted from the control unit to a drive unit of the pump so as to stop the pump.

According to the second aspect of the invention, the supply of the operating fluid to the accumulator can be stopped by stopping the operation of the pump, when something abnormal occurs in the accumulator.

According to a third aspect of the invention, there is provided a hydraulic brake device as set forth in the first or second aspect of the invention, wherein a drive unit of the pump inputs a pump activating signal to the control unit, the control unit changes over the state of the opening/closing valve from the closed state to the opened state on condition where:

the control unit determines that the fluid pressure supplied from the accumulator to the regulator valve decreases down to or lower than the predetermined range in accordance with the detection information from the fluid pressure value detecting unit; and the pump activating signal has been inputted to the control unit.

According to the third aspect of the invention, it is possible to determine in a more ensured fashion that something abnormal is occurring on the accumulator side by the input of the activating signal of the pump.

According to a fourth aspect of the invention, there is provided a hydraulic brake device as set forth in the third aspect of the invention, further comprising:

an operating state detecting unit for outputting information on whether or not the brake operation member has been operated to the control unit, wherein in addition to the condition, in a case where information that the brake operation member is not operated has been inputted to the control unit from the operating state detecting unit, the control unit changes over the state of the opening/closing valve from the closed state to the opened state.

According to the fourth aspect of the invention, it is possible to determine in a more ensured fashion that something abnormal is occurring on the accumulator side by the input of the information that the brake operation member is not operated.

According to a fifth aspect of the invention, there is provided a hydraulic brake device comprising:

a reservoir;

a fluid pressure generating unit comprising:

a pump for pumping operating fluid out of the reservoir; and an accumulator for accumulating the pumped out operating fluid within a predetermined pressure range;

a regulator valve for regulating and outputting a fluid pressure supplied from the accumulator in accordance with an operation amount of a brake operation member;

a housing in which the regulator valve is slidably fitted;

a master cylinder piston which is slidably fitted forward of the regulator valve in the housing, wherein when a normal time, the master cylinder piston is moved by virtue of the output fluid pressure outputted from the regulator valve so as to generate the master cylinder pressure, and when something abnormal occurs in which the fluid pressure supplied from the accumulator to the regulator valve decreases down to or lower than the predetermined range, the master cylinder piston which is in press contact with an outer end face of the regulator valve is moved direct mechanically so as to generate the master cylinder pressure by mechanically moving forward the regulator valve by virtue of a force applied by the brake operation member;

a normally closed opening/closing valve provided along a fluid line communicating between a side of the accumulator and the reservoir by way of the fluid pressure input side and a fluid pressure output side of the regulator valve;

an output fluid pressure value detecting unit for detecting a value of a fluid pressure outputted from the fluid pressure output side of the regulator valve to the master cylinder piston;

an operation amount detecting unit for detecting an operation amount of the brake operation member; and a control unit for controlling the opening and closing of the opening/closing valve based on each detection information from the output fluid pressure value detecting unit and the operation amount detecting unit, wherein the predetermined range of the output fluid pressure outputted from the fluid pressure output side of the regulator valve is determined so as to correspond to operation amounts of the brake operation member, and the control unit changes over the state of the opening/closing valve in the event that the control unit determines that an output fluid pressure outputted from the fluid pressure output side of the regulator valve decreases down to or lower than the predetermined range in accordance with each of detection information from the output fluid pressure value detecting unit and the operation amount detecting amount.

According to the fifth aspect of the invention, in the event that the output fluid pressure outputted from the fluid pressure output side of the regulator valve decreases down to or lower than the predetermined range which is determined in such a manner as to correspond to operation amounts of the brake operation member due to something abnormal occurring in the regulator valve, the residual pressure in the accumulator and the residual pressure in the regulator valve can be released to the atmosphere through the reservoir which communicates with the fluid line along which the opening/closing valve is provided by way of the same fluid line by changing over the state of the opening/closing valve from the closed state to the opened state.

According to a sixth aspect of the invention, there is provided a hydraulic brake device as set forth in the fifth aspect of the invention, wherein the control unit outputs a stop signal to a drive unit of the pump so as to stop the pump when the control unit changes over the state of the opening/closing valve from the closed state to the opened state.

According to the sixth aspect of the invention, the supply of the operating fluid to the accumulator can be stopped by stopping the operation of the pump, when something abnormal occurs in the accumulator.

According to the first aspect of the invention, in the event that the fluid pressure that is supplied to the regulator valve decreases down to or lower than the predetermined range due to something abnormal occurring in the accumulator, since the residual pressure in the accumulator and the residual pressure in the regulator valve can be released through the reservoir which communicates with the fluid line along which the opening/closing valve is provided by way of the same fluid line by changing over the state of the opening/closing valve from the closed state to the opened state, a predetermined braking force can be obtained in an ensured fashion by a mechanical action resulting from only an effort applied to the brake pedal by removing the effect of the residual pressure even in the event of something abnormal occurring in the accumulator.

According to the second aspect of the invention, since the supply of the operating fluid to the accumulator can be stopped by stopping the operation of the pump, when something abnormal occurs in the accumulator, the residual pressure in the accumulator can be released by preventing the increase of the residual pressure.

According to the third aspect of the invention, it becomes possible to determine in a more ensured fashion that something abnormal is occurring on the accumulator side by the input of the information that the brake operation member is not operated.

According to the fourth aspect of the invention, the occurrence of something abnormal on the accumulator side can be decided in a more ensured fashion by the input of the information that the brake operation member is not operated.

According to the fifth aspect of the invention, in the event that the output fluid pressure outputted from the fluid pressure output side of the regulator valve decreases down to or lower than the predetermined range which is determined in such a manner as to correspond to operation amounts of the brake operation member due to something abnormal occurring in the regulator valve, since the residual pressure in the accumulator and the residual pressure in the regulator valve can be released through the reservoir which communicates with the fluid line along which the opening/closing valve is provided by way of the same fluid line by changing over the state of the opening/closing valve from the closed state to the opened state, a predetermined braking force can be obtained in an ensured fashion by a mechanical action resulting from only an effort applied to the brake pedal by removing the effect of the residual pressure even in the event of something abnormal occurring in the regulator valve.

According to the sixth aspect of the invention, since the supply of the operating fluid to the accumulator can be stopped by stopping the operation of the pump, when a failure occurs in the accumulator, the residual pressure in the accumulator can be released by preventing the increase of the residual pressure.

DETAILED DESCRIPTION OF THE PREFERRED EMBODIMENTS

Figure 1:
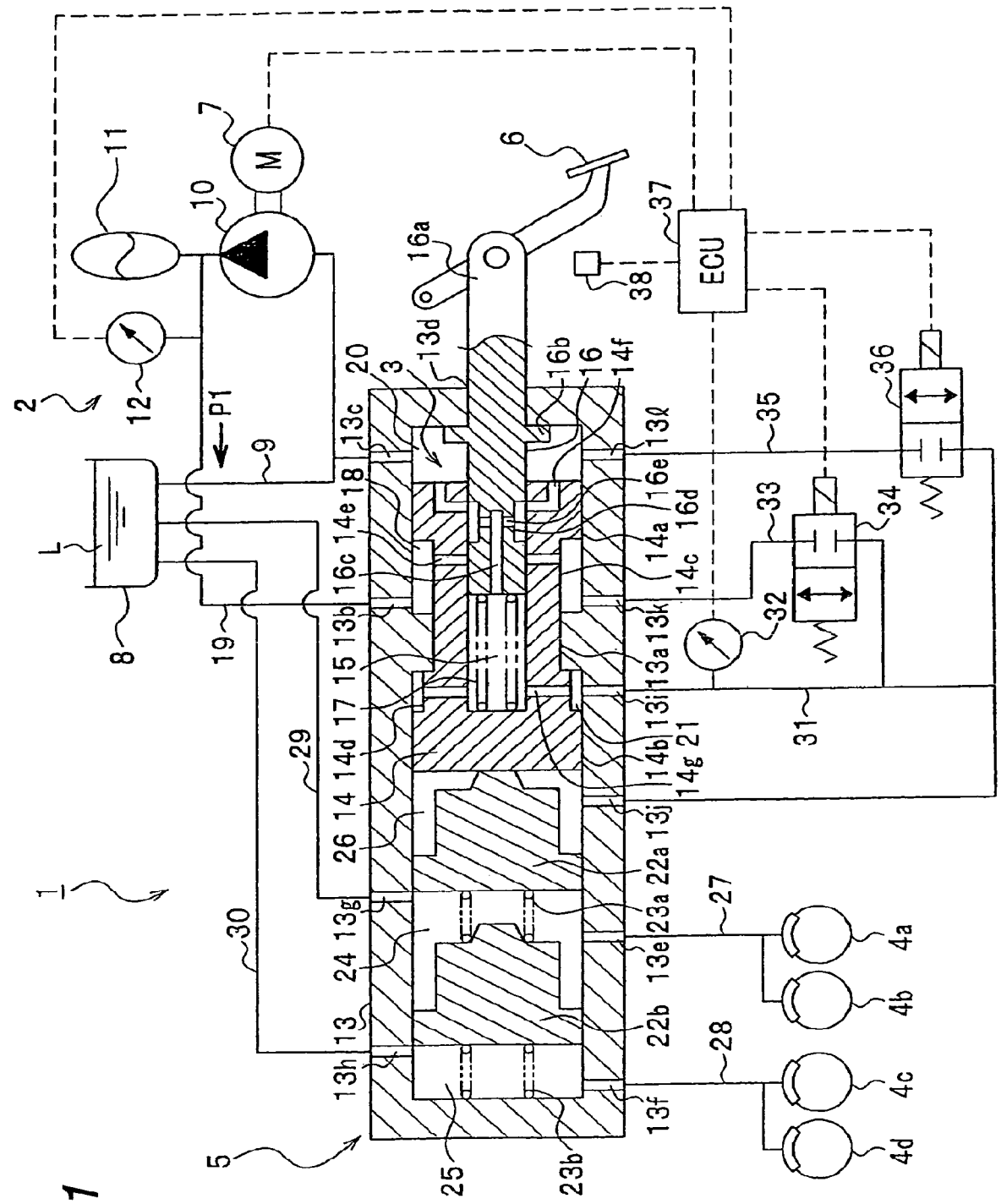
FIG. 1 is a schematic diagram which shows the configuration of a hydraulic brake device according to an embodiment of the invention when no brake is applied.

Hereinafter, the invention will be described based on an embodiment illustrated in the accompanying drawings. FIG. 1 is a schematic diagram which shows the configuration of a hydraulic brake device according to an embodiment of the invention, and in this embodiment, the invention is applied to a hydraulic brake device of a vehicle.

As shown in FIG. 1, a hydraulic brake device 1 according to the invention includes a fluid pressure generating source 2 which generates a fluid pressure P, a regulator valve 3 which regulates a fluid pressure outputted from the fluid pressure generating source 2, a master cylinder 5 which generates a fluid pressure (a master cylinder pressure) which applies a braking force to wheel cylinders 4a, 4b, 4c, 4d of respective wheel brakes by virtue of a fluid pressure (an output fluid pressure) that is outputted from the regulator valve 3, and a brake pedal 6.

The fluid pressure generating source 2 includes a motor 7, a pump 10 which is driven by the motor 7 to pump up operating fluid (brake fluid) L from a reservoir 8 through a fluid pipe 9, an accumulator 11 which accumulates the operating fluid pumped up by the pump within a predetermined pressure range, and a primary pressure sensor 12 which detects the pressure of a fluid pressure P outputted from the accumulator 11. Operating fluid L reserved in the reservoir 8 is in an atmospheric state.

The regulator valve 3 includes a valve element 14 which is slidably fitted in a cylindrical housing 13 at one end (lying on a right-hand side of the figure), a regulator valve spool 16 which is slidably fitted in a circumferential surface (an inner circumferential surface of the valve element 14) of a cylindrical output fluid pressure chamber 15 formed in such a manner that one end portion (lying on the right-hand side of the figure) thereof is made to open towards an inside of the valve element 14, and a spring 17 which biases the regulator valve spool 16 towards the right-hand side of FIG. 1.

A small-diameter middle portion 14c and a middle-diameter middle portion 14d are formed between large-diameter end portions 14a, 14b of the valve element 14 which are formed on both ends of an outer circumferential surface thereof in such a manner as to be brought into sliding contact with an inside of the housing 13, and the small-diameter middle portion 14c is brought into sliding contact with a small-diameter inner circumferential surface 13a formed in the housing 13. Note that annular seal members, not shown, are provided, respectively, on circumferential surfaces of the large-diameter end portions 14a, 14b of the valve element 14 which are brought into sliding contact with an inner circumferential surface of the housing 13 and a circumferential surface of the small-diameter middle portion 14c of the valve element 14 which is brought into sliding contact with the small-diameter inner circumferential surface 13a of the housing 13.

A high pressure chamber 18 which is defined by the large-diameter end portion 14a and the small-diameter middle portion 14c of the valve element 14 and the inner circumferential surface and the small-diameter inner circumferential surface 13a of the housing 13 is connected to the accumulator 11 via a fluid passage 13b formed in the housing 13 and a fluid pipe 19 connected to the fluid passage 13b. In addition, a low pressure chamber 20 which is defined by an outer end face of the large-diameter end portion 14a of the valve element 14 and an end face at the inner end (lying on the fight-hand side of the figure) of the housing 13 is connected to the reservoir 8 via a fluid passage 13c formed in the housing 13 and the fluid pipe 9 which is connected to the fluid passage 13c.

A shaft portion 16a is integrally formed on the regulator valve spool 16 at an opposite end (lying on the right-hand side of the figure) to the output fluid pressure chamber 15 in such a manner as to protrude from an end face opening 13d of the housing 13. An annular seal member, not shown, is provided on a circumferential surface of the shaft portion 16a of the regulator valve spool 16 which is brought into sliding contact with a circumferential surface of the end face opening 13d of the housing. The brake pedal 6, which is rotatably held, is connected to a distal end portion of the shaft portion 16a of the regulator valve spool 16, and in a non-brake-applied state (a state shown in FIG. 1) in which the driver does not depress on the brake pedal 6, a large-diameter middle portion 16b of the regulator valve spool 16 is brought into abutment with the inner end face of the housing 13 by virtue of a biasing force of the spring 17. A known brake stroke sensor 38, which is adapted to detect an operating state of the brake pedal 6 (whether or not the brake pedal 6 is depressed and an operating amount or travel) by a non-contact method, is provided on the brake pedal 6.

The regulator valve spool 16 has a fluid passage 16c formed in such a manner as to extend from a center of an end face thereof which lies within the output fluid pressure chamber 15 along a longitudinal direction thereof (towards a left-hand side of the figure), a small-diameter middle portion 16d formed on an outer circumferential thereof and a communication path 16e which establishes a communication between the small-diameter portion 16d and the fluid passage portion 16c. Formed in the valve element 14 are a communication path 14e which establishes a communication between an inner circumferential surface of the valve element 14 and the high pressure chamber 18 and a communication path 14f which establishes a communication between the inner circumferential and the low pressure chamber 20. In addition, in the non-brake-applied state (the state shown in FIG. 1), the communication path 14e of the valve element 14 is sealed or cut off by the outer circumferential surface of the regulator valve spool 16, and the communication path 14f is made to communicate with the small-diameter middle portion 16d of the regulator valve spool 16, whereas in a brake-applied state (a state shown in FIG. 2), the communication path 14e of the valve element 14 is made to communicate with the small-diameter middle portion 16d of the regulator valve spool 16 and the communication path 14f is sealed or cut off by the outer circumferential surface of the regulator valve spool 16.

In addition, a communication path 14g is formed in the middle-diameter middle portion 14d of the valve element 14 in such a manner as to establish a communication between an output chamber 21 formed on an outer side (a side lying to the housing 13) thereof and the output fluid pressure chamber 15.

The master cylinder 5 is provided in such a manner as to be adjacent to the valve element 14 in the housing 13 at the other end portion (on the left-hand side of the figure) of the housing and includes primary and secondary pistons 22a, 22b which are slidably fitted in the inner circumference of the housing, respectively, and springs 23a, 23b which bias the primary and secondary pistons 22a, 22b towards the right-hand side of FIG. 1, respectively. In addition, annular seal members, not shown, are provided, respectively, on circumferential surfaces of the primary and secondary pistons 22a, 22b.

A primary master cylinder fluid pressure chamber 24 is defined between the primary piston 22a and the secondary piston 22b, and a secondary master cylinder fluid pressure chamber 25 is defined between the secondary piston 22b and an inner end face (lying on the left-hand side of the figure). In addition, an auxiliary fluid pressure chamber 26 is defined between the primary piston 22a and an end face of the valve element 14.

The primary and secondary master cylinder fluid pressure chambers 24, 25 are connected to the wheel cylinders 4a, 4b, 4c, 4d which are provided on the corresponding road wheels via fluid passages 13e, 13f formed in the housing 13, respectively, and fluid pipes 27, 28 which are connected to the fluid passages 13e, 13f, respectively. In addition, the primary and secondary master cylinder fluid pressure chambers 24, 25 are connected to the reservoir 8 via fluid passages 13g, 13h and fluid pipes 29, 30 which are connected, respectively, to the fluid passages 13g, 13h, respectively.

The output chamber 21 and the auxiliary fluid pressure chamber 26 of the regulator valve 3 communicate with each other via an output fluid pipe 31 which connects together respective fluid passages 13i, 13j formed in the housing 13. A secondary pressure sensor 32 is provided along the output fluid pipe 31. The high pressure chamber 18 of the regulator valve 3 communicate with the output fluid pipe 31 through a primary branched fluid pipe 33 which is connected to a fluid path 13k formed in the housing 13. A normally closed primary electromagnetic or solenoid valve 34 is provided on the primary branched fluid pipe 33. In addition, the low pressure chamber 20 of the regulator valve 3 communicates with the output fluid pipe 31 via a secondary branched fluid pipe 35 which is connected to a fluid passage 13l formed in the housing 13. A normally closed secondary electromagnetic vale or solenoid valve 36 is provided on the secondary branched fluid pipe 35.

A control unit (ECU) 37 controls the ON/OFF of the motor 7 and the opening and closing of the primary and secondary solenoid opening/closing valves 34, 36 based on a pressure detection signal inputted from a primary pressure sensor 12 or a secondary pressure sensor 32 and a stroke detection signal inputted from the brake stroke sensor 38 (a detailed description will be made later on).

Next, the operation of the hydraulic brake device 1 that has been described heretofore will be described below.

<No Brake Application>

In the condition shown in FIG. 1 in which the brake pedal 6 is not depressed (in which no brake is applied), the operating fluid (brake fluid) L is pumped up from the reservoir 8 by the pump 10 through the fluid pipe 9 by driving (switching ON) the motor 7, and the operating fluid so pumped up is pressurized by the accumulator 11 so as to be accumulated therein at a predetermined fluid pressure. The fluid pressure P1 outputted from the accumulator 11 is supplied to the high pressure chamber 18 of the regulator valve 3 via the fluid pipe 19 and the fluid passage 13b. As this occurs, the control unit 37 controls the drive of the motor 7 based on a detection signal inputted from the primary pressure sensor 2 and causes the fluid pressure P1 which is set to fall within a predetermined pressure range to be outputted.

In this condition, since the communication path 14e is sealed by the outer surface of the regulator valve spool 16 which is biased rightward by the spring 17, the fluid pressure P1 is not outputted from the high pressure chamber 18 to the output fluid pressure chamber 15, whereby in the condition shown in FIG. 1 in which the brake pedal is not depressed and hence no brake is applied, no fluid pressure is generated in the output fluid pressure chamber 15. In addition, the valve element 14 is biased to a retracted position (a position shown in FIG. 1) by virtue of the pressure of the high pressure chamber 18.

Note that when no brake is applied as has been described above, a non-operated-state signal indicating that the brake pedal 6 is not depressed is inputted into the control unit 37 from the brake stroke sensor 38, and a drive signal is inputted thereinto from the motor 7 when the motor 7 is driven.

<Normal Brake Application>

Figure 2:
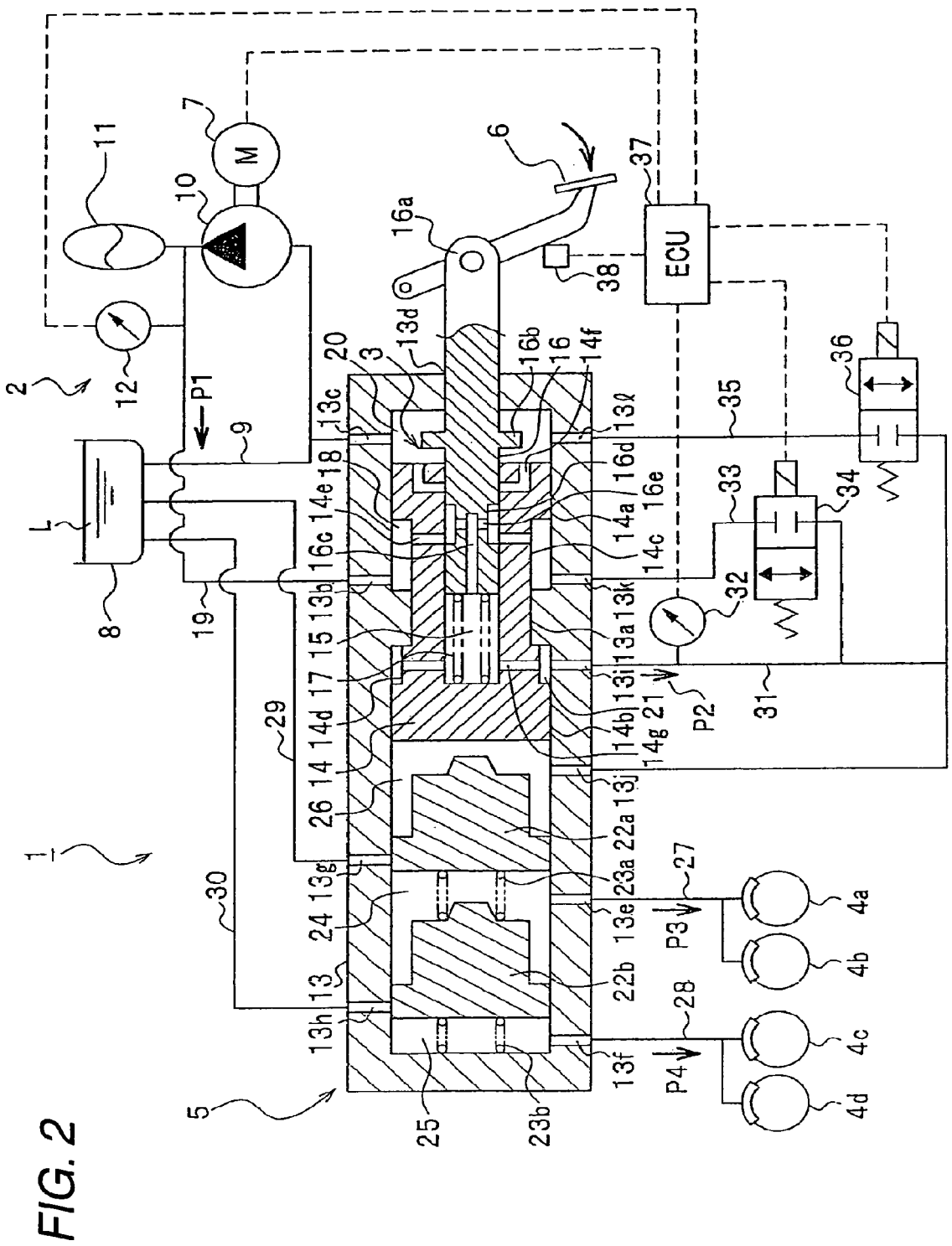
FIG. 2 is a schematic diagram which shows the configuration of the hydraulic brake device according to the embodiment of the invention when the brakes are applied normally.

In normal brake application, as shown in FIG. 2, when the brake pedal 6 is depressed by the driver, the regulator valve spool 16 slides towards a deep end (towards the left-hand side of the figure) of the output fluid pressure chamber 15 at the distal end portion thereof against the biasing force of the spring 17. In this condition, the fluid pressure P1 is outputted from the high pressure chamber 18 to the output fluid pressure chamber 15, which is in communication therewith, via the communication path 14e, the small-diameter middle portion 16d, the communication path 16e and the fluid passage 16c, whereby in the output fluid pressure chamber 15, the fluid pressure P1 so inputted is regulated to a fluid pressure (an output fluid pressure) P2 (P2>P1) in accordance with the amount in which the brake pedal 6 was depressed.

The fluid pressure P2 so regulated is then outputted to the auxiliary fluid pressure chamber 26 via the communication path 14g, the output chamber 21, the fluid passage 13i, the output fluid pipe 31 and the fluid passage 13j. The primary piston 22a slides towards a deeper end (a left-hand side of FIG. 2) of the housing 13 against a biasing force of the spring 23a by virtue of the fluid pressure P2 inputted into the auxiliary fluid pressure chamber 26, whereby a fluid pressure P3 is generated in the primary master cylinder fluid pressure chamber 24. Furthermore, the secondary piston 22b slides towards the deeper end (the left-hand side of FIG. 2) against a biasing force of the spring 23b by virtue of the fluid pressure (master cylinder pressure) P3 generated in the primary master cylinder fluid pressure chamber 24, whereby a fluid pressure (a master cylinder pressure) P4 is generated in the secondary master cylinder fluid pressure chamber 25.

By this, the fluid pressures P3, P4 generated, respectively, in the primary and secondary master cylinder fluid pressure chambers 24, 25 are outputted to the respective wheel cylinders 4a, 4b, 4c, 4d through the respective fluid passages 13e, 13f and the respective fluid pipes 27, 28, whereby a predetermined braking force can be obtained with a small effort.

Thus, when the brakes are applied normally, by outputting the fluid pressure P2 which is regulated in accordance with a depressing amount of the brake pedal 6 from the output fluid pressure chamber 15 of the regulating valve 3 to the auxiliary fluid pressure chamber 26 of the master cylinder 5, the predetermined braking force can be obtained with a small effort.

In addition, when the depression or effort applied to the brake pedal 6 for application of the brakes is removed, the regulator valve spool 16 slides towards the brake pedal 16 end (a right-hand side of FIG. 2) of the output fluid pressure chamber 15 back to the position where it lies when no brake is applied as shown in FIG. 1 by virtue of the biasing force by the spring 17, whereby the output of the fluid pressure P1 to the output fluid pressure chamber 15 is cut off. In this condition, the output fluid pressure chamber 15 communicates with the reservoir 8 through the communication paths 16c, 16d, the small-diameter middle portion 16d, the communication path 14f, the low pressure chamber 20, the fluid passage 13c and the fluid pipe 9, and the operating fluid in the output fluid pressure chamber 15 and the auxiliary fluid pressure chamber 26 is under the atmospheric pressure.

In addition, both the primary and secondary pistons 22a, 22b also slide towards the valve element 14 side (the right-hand side of FIG. 2) of the housing by virtue of the biasing forces of the springs 23a, 23b back to the positions where they lie when no brake is applied as shown in FIG. 1. In this condition, the primary and secondary master cylinder fluid pressure chambers 24, 25 communicate with the reservoir 8, respectively, through the fluid passages 13g, 13h and the fluid pipes 29, 30, and the operating fluid in the primary and secondary master cylinder fluid pressure chambers 24, 25 are under the atmospheric pressure.

<Occurrence of Abnormality in Accumulator>

In the non-brake-applied condition shown in FIG. 1 in which the control unit 37 determines based on the non-operated-state signal from the brake stroke sensor 38 that the brake pedal 38 is not depressed and based on the drive signal from the motor 7 that the motor 7 (the pump 10) is driven, in the event that something abnormal (a failure) occurs in the accumulator 11, the fluid pressure P1 outputted from the accumulator 11 decreases, irrespective of the motor 7 being driven, to become a low pressure (including a case where the fluid pressure is almost zero) equal to or lower than the predetermined range which is set in advance, whereby the aforesaid normal brake application cannot be implemented.

Then, in this embodiment, in the event that something abnormal (a failure) occurs in the accumulator 11 in the non-brake-applied condition shown in FIG. 1, the control unit 37 determines from a pressure detection signal inputted from the primary pressure sensor 12 that the fluid pressure P1 outputted from the accumulator 11 is decreasing to become a low pressure which is equal to or lower than the predetermined pressure range that is determined in advance and decides that something abnormal (a failure) has occurred in the accumulator 11. When deciding that something abnormal has occurred in the accumulator 11, the control unit 37 outputs opening signals to the primary and secondary solenoid opening/closing valves 34, 36 and also outputs an OFF signal to the motor 7.

Figure 3:
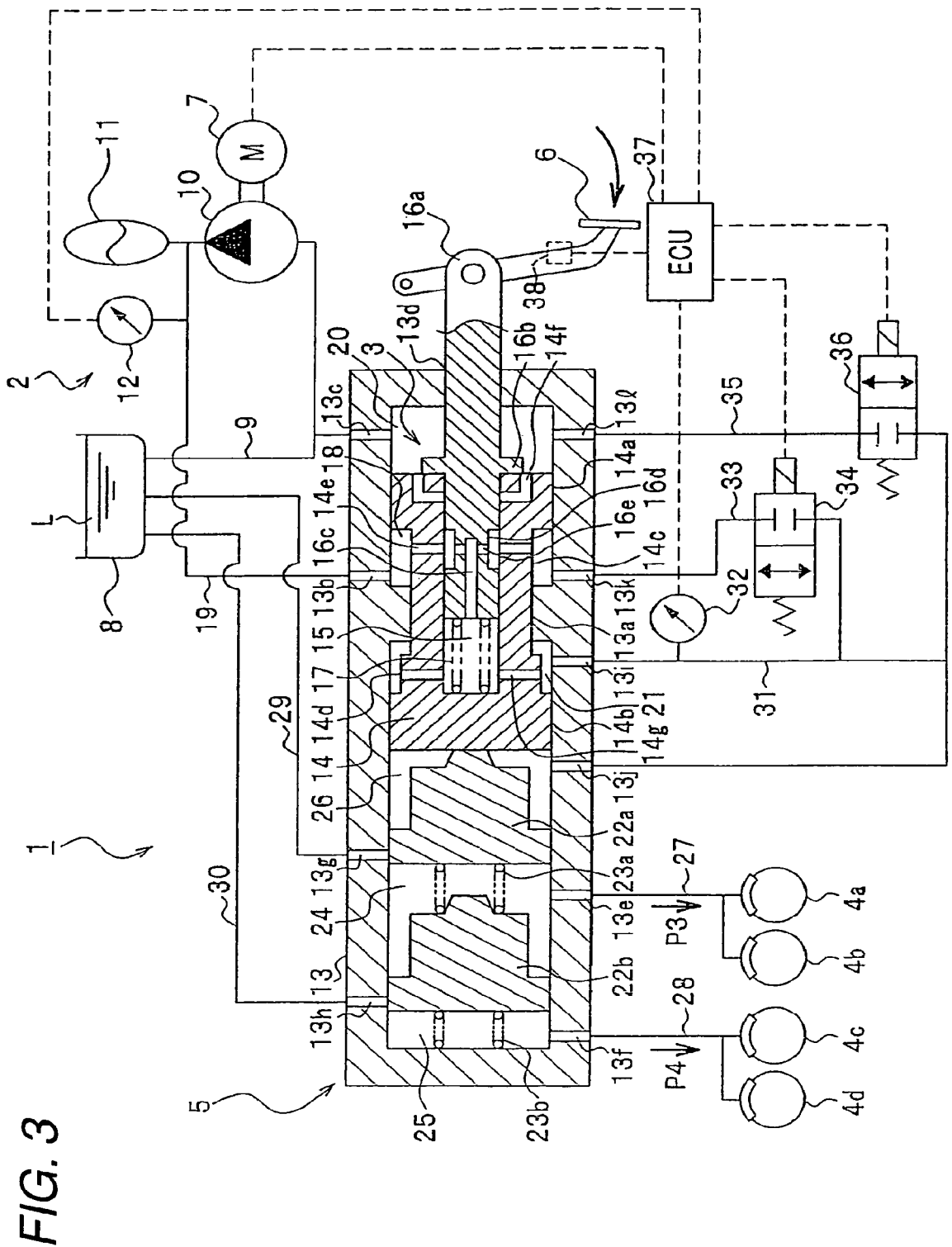
FIG. 3 is a schematic diagram which shows the configuration of the hydraulic brake device according to the embodiment of the invention when the brakes are mechanically applied by only an effort applied to a brake pedal.

When something abnormal occurs in the accumulator 11 as has been described above, a braking force can be generated in each of the wheel cylinders 4a, 4b, 4c, 4d by the mechanical action resulting from only an effort applied to the brake pedal 6. Namely, in the event that something abnormal occurs in the accumulator 11 and the fluid pressure P1 is not outputted into the high pressure chamber 18, as shown in FIG. 3, when the brake pedal 6 is depressed strongly with a larger effort to be depressed much deeper than when the pedal is depressed for normal braking, the distal end portion (lying on the left-hand side in FIG. 3) of the regulator valve spool 16 slides into a deeper portion (a deeper portion than the portion which the spool reaches when the brakes are applied normally (towards the left-hand side in FIG. 3)) against the biasing force of the spring 17, whereby the large-diameter middle portion 16b of the regulator valve spool 16 is brought into press contact with the end face of the valve element 14, and the valve element 14 slides towards the auxiliary fluid pressure chamber 26 side (the left-hand side in FIG. 2) of the housing 13.

By this, the primary piston 22a, which is in abutment with an outer end face of the valve element 14 by virtue of the biasing force of the spring 23a, mechanically slides towards an inner end face (the left-hand side in FIG. 3) of the housing 13 by virtue of strong depression of the brake pedal, whereby a fluid pressure P3 is generated in the primary master cylinder fluid pressure chamber 24. Furthermore, the secondary piston 22b slides towards the inner end face (the left-hand side in FIG. 2) of the housing 13 against the biasing force of the spring 23b by virtue of the fluid pressure P3 so generated in the primary master cylinder fluid pressure chamber 24, whereby a fluid pressure P4 is generated in the secondary master cylinder fluid chamber 25.

By this, the fluid pressures P3, P4 generated, respectively, in the primary and secondary master cylinder fluid chambers 24, 25 are outputted to the respective wheel cylinders 4a, 4b, 4c, 4d through the respective fluid passages 13e, 13f and the respective fluid pipes 27, 28, whereby the predetermined braking force is obtained.

In the event that a braking force is generated in each of the wheel cylinders 4a, 4b, 4c, 4d by the mechanical action resulting from only an effort applied to the brake pedal 6a when something abnormal has occurred in the accumulator 11 as has been described above (refer to FIG. 3), in this embodiment, since the state of the primary and secondary solenoid opening/closing valves 34, 36 is changed over from the closed state to the opened state by the opening signal from the control unit 37 as has been described above, the high pressure chamber 18 is made to communicate with the low pressure chamber 20 through the fluid passage 13k, the primary branched fluid pipe 33 along which the primary solenoid opening/closing valve 34 is provided, the output fluid pipe 31, the secondary branched fluid pipe 35 along which the secondary solenoid opening/closing valve 36 is provided and the fluid passage 13l. Furthermore, the output fluid pressure chamber 15, which is in communication with the high pressure chamber 18, is made to communicate with the low pressure chamber 20 through the communication path 14g, the output chamber 21, the fluid passage 13i, the output fluid pipe 31, the secondary branched fluid pipe 35 along which the secondary solenoid opening/closing valve 36 is provided and the fluid passage 13l. In addition, the low pressure chamber 21 is in communication with the reservoir 8 through the fluid passage 13c and the fluid pipe 9.

By this, the residual pressure in the high pressure chamber 18 is released to the atmosphere through the reservoir 8 which is in communication therewith due to the primary and secondary solenoid opening/closing valves 34, 36 being opened, while the residual pressure in the output fluid pressure chamber 15 is released to the atmosphere through the reservoir 8 due to the secondary solenoid opening/closing valve 36 being opened.

In addition, by stopping the driving of the motor 7 y the OFF signal from the control unit 37 to thereby stop the pumping up of operating fluid into the accumulator 11 by the pump 10, the residual pressure in the accumulator 11 can be reduced to zero in an ensured fashion after it has been decided that something abnormal has occurred in the accumulator 11.

Thus, in the event that a braking force is generated in each of the wheel cylinders 4a, 4b, 4c, 4d by the mechanical action resulting from only an effort applied to the brake pedal 6a when something abnormal has occurred in the accumulator 11 as has been described above (refer to FIG. 3), in this embodiment, as has just been described, the residual pressure in the high pressure chamber 18 is released to the atmosphere through the reservoir 8 which is in communication therewith due to the primary and secondary solenoid opening/closing valves 34, 36 being opened, while the residual pressure in the output fluid pressure chamber 15 is released to the atmosphere through the reservoir 8 due to the secondary solenoid opening/closing valve 36 being opened. Furthermore, since the driving of the motor 7 is stopped, the residual pressure is outputted in no case from the accumulator 11 after it has been decided that something abnormal has occurred in the accumulator 11.

Consequently, since the generation of a fluid pressure in the output fluid pressure chamber 15 is prevented which interrupts the forward (the left-hand side in FIG. 3) movement of the regulator valve spool 16, whereby the fluid pressure in the high pressure chamber 18 which interrupts the forward movement of the valve element 14 is released, even in the event that something abnormal occurs in the accumulator 11, a braking force can be generated in each of the wheel cylinders 4a, 4b, 4c, 4d by the mechanical action resulting from only the effort applied to the brake pedal 6 in an ensured fashion.

Note that while in the embodiment, the invention has described as something abnormal occurring in the accumulator 11 when no brake is applied, since the fluid pressure in the output fluid pressure chamber 15 is similarly released to the atmosphere through the reservoir 8 with which the output fluid pressure chamber 15 communicates by the opening of the secondary solenoid opening/closing valve 36 even in the event that something abnormal occurs in the accumulator 11 when the brakes are applied normally as has been described above, a braking force can be generated in each of the wheel cylinders 4a, 4b, 4c, 4d by the mechanical action resulting from only the effort applied to the brake pedal 6 in an ensured fashion.

<Occurrence of Something Abnormal in Regulator Valve 3>

In the application of brakes as shown in FIG. 2, when the predetermined fluid pressure P2 that is outputted from the output fluid pressure chamber 15 to the auxiliary fluid pressure chamber 26 decreases largely or becomes almost zero due to, for example, the communication path 14g of the valve element 14 being clogged up with foreign matters, irrespective of the predetermined fluid pressure P1 being outputted from the accumulator 11 to the high pressure chamber 18 of the regulator valve 3, the afore-described normal brake application cannot be implemented.

Then, in this embodiment, in the event that something abnormal occurs in the regulator valve 3 when the brakes are applied as shown in FIG. 2, the control unit 37 determines from a pressure detection signal inputted from the secondary pressure sensor 32 and a stroke detection signal inputted from the brake stroke sensor 38 that the fluid pressure P2 outputted from the output fluid pressure chamber 15 decreases to become a low pressure which is equal to or lower than the predetermined pressure range that is determined in such a manner as to correspond to brake application amounts or to become almost zero and decides that something abnormal has occurred in the regulator valve 3. When deciding that something abnormal has occurred in the regulator valve 3, the control unit 37 outputs opening signals to the primary and secondary solenoid opening/closing valves and also outputs an OFF signal to the motor 7.

When something abnormal has occurred in the regulator valve 3 as has just been described, a braking force can be generated in each of the wheel cylinders 4a, 4b, 4c, 4d by the mechanical action resulting from only the effort applied to the brake pedal 6. Namely, in the normal brake application shown in FIG. 2, in the event that the predetermined fluid pressure P2 is not outputted to the auxiliary fluid pressure chamber 26 due to something abnormal occurring in the regulator valve 3, as shown in FIG. 3, when the brake pedal 6 is depressed strongly with a larger effort to be depressed much deeper than when the pedal is depressed for normal braking, the distal end portion (lying on the left-hand side in FIG. 3) of the regulator valve spool 16 slides into a deeper portion (a deeper portion than the portion which the spool reaches when the brakes are applied normally (towards the left-hand side in FIG. 3)) against the biasing force of the spring 17, whereby the large-diameter middle portion 16b of the regulator valve spool 16 is brought into press contact with the outer end face of the valve element 14, and the valve element 14 slides towards the auxiliary fluid pressure chamber 26 side (the left-hand side in FIG. 2) of the housing 13.

Consequently, the primary piston 22a, which is in abutment with an outer end face of the valve element 14 by virtue of the biasing force of the spring 23a, mechanically slides towards an inner end face (the left-hand side in FIG. 3) of the housing 13 by virtue of strong depression of the brake pedal, whereby a fluid pressure P3 is generated in the primary master cylinder fluid pressure chamber 24. Furthermore, the secondary piston 22b slides towards the inner end face (the left-hand side in FIG. 2) of the housing 13 against the biasing force of the spring 23b by virtue of the fluid pressure P3 so generated in the primary master cylinder fluid pressure chamber 24, whereby a fluid pressure P4 is generated in the secondary master cylinder fluid chamber 25.

By this, the fluid pressures P3, P4 generated, respectively, in the primary and secondary master cylinder fluid chambers 24, 25 are outputted to the respective wheel cylinders 4a,4b, 4c, 4d through the respective fluid passages 13e, 13f and the respective fluid pipes 27, 28, whereby the predetermined braking force is obtained.

In the event that a braking force is generated in each of the wheel cylinders 4a, 4b, 4c, 4d by the mechanical action resulting from only an effort applied to the brake pedal 6a when something abnormal has occurred in the regulator valve 3 as has been described above (refer to FIG. 3), in this embodiment, since the state of the primary and secondary solenoid opening/closing valves 34, 36 is changed over from the closed state to the opened state by the opening signal from the control unit 37 as has been described above, the high pressure chamber 18 is made to communicate with the low pressure chamber 20 through the fluid passage 13k, the primary branched fluid pipe 33 along which the primary solenoid opening/closing valve 34 is provided, the output fluid pipe 31, the secondary branched fluid pipe 35 along which the secondary solenoid opening/closing valve 36 is provided and the fluid passage 13l. Furthermore, the output fluid pressure chamber 15, which is in communication with the high pressure chamber 18, is made to communicate with the low pressure chamber 20 through the communication path 14g, the output chamber 21, the fluid passage 13i, the output fluid pipe 31, the secondary branched fluid pipe 35 along which the secondary solenoid opening/closing valve 36 is provided and the fluid passage 13l. In addition, the low pressure chamber 21 is in communication with the reservoir 8 through the fluid passage 13c and the fluid pipe 9.

By this, the residual pressure in the high pressure chamber 18 is released to the atmosphere through the reservoir 8 which is in communication therewith due to the primary and secondary solenoid opening/closing valves 34, 36 being opened, while the residual pressure in the output fluid pressure chamber 15 is released to the atmosphere through the reservoir 8 due to the secondary solenoid opening/closing valve 36 being opened.

In addition, by stopping the driving of the motor 7 y the OFF signal from the control unit 37 to thereby stop the pumping up of operating fluid into the accumulator 11 by the pump 10, the residual pressure in the accumulator 11 can be reduced to zero in an ensured fashion after it has been decided that something abnormal has occurred in the regulator valve 3.

Thus, in the event that a braking force is generated in each of the wheel cylinders 4a, 4b, 4c, 4d by the mechanical action resulting from only an effort applied to the brake pedal 6a when something abnormal has occurred in the regulator valve 3 as has been described above (refer to FIG. 3), in this embodiment, as has just been described, the residual pressure in the high pressure chamber 18 is released to the atmosphere through the reservoir 8 which is in communication therewith due to the primary and secondary solenoid opening/closing valves 34, 36 being opened, while the residual pressure in the output fluid pressure chamber 15 is released to the atmosphere through the reservoir 8 due to the secondary solenoid opening/closing valve 36 being opened. Furthermore, since the driving of the motor 7 is stopped, the residual pressure is outputted in no case from the accumulator 11 after it has been decided that something abnormal has occurred in the regulator valve 3.

Consequently, since the generation of a fluid pressure in the output fluid pressure chamber 15 is prevented which interrupts the forward (the left-hand side in FIG. 3) movement of the regulator valve spool 16, whereby the fluid pressure in the high pressure chamber 18 which interrupts the forward movement of the valve element 14 is released, even in the event that something abnormal occurs in the regulator valve 3, a braking force can be generated in each of the wheel cylinders 4a, 4b, 4c, 4d by the mechanical action resulting from only the effort applied to the brake pedal 6 in an ensured fashion.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A hydraulic brake device comprising:
    a reservoir;
    a fluid pressure generating unit comprising:
        a pump for pumping operating fluid out of the reservoir; and
        an accumulator for accumulating the pumped out operating fluid within a predetermined pressure range;
        a regulator valve for regulating and outputting a fluid pressure supplied from the accumulator in accordance with an operation amount of a brake operation member;
    a housing in which the regulator valve is slidably fitted;
    a master cylinder piston which is slidably fitted forward of the regulator valve in the housing, wherein
    during normal braking operation, the master cylinder piston is moved by virtue of the output fluid pressure outputted from the regulator valve so as to generate a master cylinder pressure, and
    when something abnormal occurs in which the fluid pressure supplied from the accumulator to the regulator valve decreases down to or lower than the predetermined range, the master cylinder piston, which is in press contact with an outer end face of the regulator valve, is moved mechanically so as to generate the master cylinder pressure by mechanically moving forward the regulator valve by virtue of a force applied by the brake operation member;
    a normally closed opening/closing valve provided along a fluid line communicating between a side of the accumulator and the reservoir by way of the fluid pressure input side and a fluid pressure output side of the regulator valve or a fluid line communicating directly between the accumulator and the reservoir;
    a fluid pressure value detecting unit for detecting a value of the fluid pressure supplied from the accumulator to the regulator valve; and
    a control unit for controlling the opening and closing of the opening/closing valve based on detection information from the fluid pressure value detecting unit,
    wherein the control unit changes over the state of the opening/closing valve from a closed state to an opened state in the event that the control unit determines that the fluid pressure supplied from the accumulator to the regulator valve decreases down to or lower than the predetermined range, based on the detection information from the fluid pressure value detecting unit, whereby any residual pressure remaining in the regulator valve is reduced to facilitate forward mechanical movement of the regulator valve, and to promote manual application of the brakes.

2. The hydraulic brake device as set forth in claim 1, wherein when the opening/closing valve is changed over from the closed state to the opened state, a stop signal is outputted from the control unit to a drive unit of the pump so as to stop the pump.

3. The hydraulic brake device as set forth in claim 1, wherein a drive unit of the pump inputs a pump activating signal to the control unit,
    the control unit changes over the state of the opening/closing valve from the closed state to the opened state on condition where:
    the control unit determines that the fluid pressure supplied from the accumulator to the regulator valve decreases down to or lower than the predetermined range in accordance with the detection information from the fluid pressure value detecting unit; and the pump activating signal has been inputted to the control unit.

4. The hydraulic brake device as set forth in claim 3, further comprising:

an operating state detecting unit for outputting information on whether or not the brake operation member has been operated to the control unit, wherein in addition to the condition, in a case where information that the brake operation member is not operated has been inputted to the control unit from the operating state detecting unit, the control unit changes over the state of the opening/closing valve from the closed state to the opened state.

5. A hydraulic brake device comprising:

a reservoir;

a fluid pressure generating unit comprising:

a pump for pumping operating fluid out of the reservoir; and an accumulator for accumulating the pumped out operating fluid within a predetermined pressure range;

a regulator valve for regulating and outputting a fluid pressure supplied from the accumulator in accordance with an operation amount of a brake operation member;

a housing in which the regulator valve is slidably fitted;

a master cylinder piston which is slidably fitted forward of the regulator valve in the housing, wherein during normal braking operation, the master cylinder piston is moved by virtue of the output fluid pressure outputted from the regulator valve so as to generate the master cylinder pressure, and when something abnormal occurs in which the fluid pressure supplied from the accumulator to the regulator valve decreases down to or lower than the predetermined range, the master cylinder piston which is in press contact with an outer end face of the regulator valve is moved mechanically so as to generate the master cylinder pressure by mechanically moving forward the regulator valve by virtue of a force applied by the brake operation member;

a normally closed opening/closing valve provided along a fluid line communicating between a side of the accumulator and the reservoir by way of the fluid pressure input side and a fluid pressure output side of the regulator valve;

an output fluid pressure value detecting unit for detecting a value of a fluid pressure outputted from the fluid pressure output side of the regulator valve to the master cylinder piston;

an operation amount detecting unit for detecting an operation amount of the brake operation member; and a control unit for controlling the opening and closing of the opening/closing valve based on each detection information from the output fluid pressure value detecting unit and the operation amount detecting unit, wherein the predetermined range of the output fluid pressure outputted from the fluid pressure output side of the regulator valve is determined so as to correspond to operation amounts of the brake operation member, and the control unit opens the opening/closing valve in the event that the control unit determines that an output fluid pressure outputted from the fluid pressure output side of the regulator valve decreases down to or lower than the predetermined range in accordance with each of detection information from the output fluid pressure value detecting unit and the operation amount detecting amount, whereby any residual pressure remaining in the regulator valve is reduced to facilitate forward mechanical movement of the regulator valve.

6. The hydraulic brake device as set forth in claim 5, wherein the control unit outputs a stop signal to a drive unit of the pump so as to stop the pump when the control unit changes over the state of the opening/closing valve from the closed state to the opened state.

7. A hydraulic brake device comprising:

a reservoir;

a fluid pressure generating unit comprising:

a pump for pumping operating fluid out of the reservoir; and an accumulator for accumulating the pumped out operating fluid within a predetermined pressure range;

a regulator valve for regulating and outputting a fluid pressure supplied from the accumulator in accordance with an operation amount of a brake operation member;

a housing in which the regulator valve is slidably fitted;

a master cylinder piston which is slidably fitted forward of the regulator valve in the housing, wherein a normal braking operation,, the master cylinder piston is moved by virtue of the output fluid pressure outputted from the regulator valve so as to generate the master cylinder pressure, and when something abnormal occurs in which the fluid pressure supplied from the accumulator to the regulator valve decreases down to or lower than the predetermined range, the master cylinder piston which is in press contact with an outer end face of the regulator valve is moved mechanically so as to generate the master cylinder pressure by mechanically moving forward the regulator valve by virtue of a force applied by the brake operation member;

a normally closed opening/closing valve provided along a fluid line communicating between a side of the accumulator and the reservoir by way of the fluid pressure input side and a fluid pressure output side of the regulator valve or a fluid line communicating directly between the accumulator and the reservoir;

a fluid pressure value detecting unit for detecting a value of the fluid pressure supplied from the accumulator to the regulator valve; and a control unit for controlling the opening and closing of the opening/closing valve based on detection information from the fluid pressure value detecting unit, wherein the control unit changes over the state of the opening/closing valve from a closed state to an opened state in the event that the control unit determines that the fluid pressure supplied from the accumulator to the regulator valve decreases down to or lower than the predetermined range based on the detection information from the fluid pressure value detecting unit;

wherein a drive unit of the pump inputs a pump activating signal to the control unit, the control unit changes over the state of the opening/closing valve from the closed state to the opened state on condition where:

the control unit determines that the fluid pressure supplied from the accumulator to the regulator valve decreases down to or lower than the predetermined range in accordance with the detection information from the fluid pressure value detecting unit;

the pump activating signal has been inputted to the control unit;

where the hydraulic brake device further comprises:

an operating state detecting unit for outputting information on whether or not the brake operation member has been operated to the control unit, wherein in addition to the condition, in a case where information that the brake operation member is not operated has been inputted to the control unit from the operating state detecting unit, the control unit changes over the state of the opening/closing valve from the closed state to the opened state.

8. A method of operating a hydraulic brake device, said hydraulic brake device comprising:

a reservoir;

a fluid pressure generating unit comprising:
  a pump for pumping operating fluid out of the reservoir; and
  an accumulator for accumulating the pumped out operating fluid within a predetermined pressure range;

a regulator valve for regulating and outputting a fluid pressure supplied from the accumulator in accordance with an operation amount of a brake pedal;

a housing in which the regulator valve is slidably fitted;

a master cylinder piston which is slidably fitted in the housing forward of the regulator valve, a normally closed opening/closing valve provided along a fluid line communicating between a side of the accumulator and the reservoir by way of the fluid pressure input side and a fluid pressure output side of the regulator valve or a fluid line communicating directly between the accumulator and the reservoir;

a fluid pressure value detecting unit for detecting a value of the fluid pressure supplied from the accumulator to the regulator valve; and a control unit for controlling the opening and closing of the opening/closing valve based on detection information from the fluid pressure value detecting unit; and an operating state detecting unit for outputting information on whether or not the brake pedal has been operated to the control unit;

wherein said method comprises the steps of:

a) during normal operation, moving the master cylinder piston via output fluid pressure outputted from the regulator valve so as to generate master cylinder pressure, b) when fluid pressure supplied from the accumulator to the regulator valve decreases down to or lower than the predetermined range, mechanically moving the master cylinder piston which is in press contact with an outer end face of the regulator valve to mechanically move the regulator valve forward by virtue of a force applied by the brake pedal so as to generate master cylinder pressure; and c) opening the opening/closing valve in the event that the control unit determines that the fluid pressure supplied from the accumulator to the regulator valve decreases down to or lower than the predetermined range, based on the detection information from the fluid pressure value detecting unit;

wherein a drive unit of the pump inputs a pump activating signal to the control unit, the control unit changes over the state of the opening/closing valve from the closed state to the opened state on condition where the pump activating signal has been inputted to the control unit;

wherein in addition to the condition, in a case where information that the brake pedal is not operated has been inputted to the control unit from the operating state detecting unit, the control unit changes over the state of the opening/closing valve from the closed state to the opened state.

\* \* \* \* \*